(12) United States Patent
Tsubone et al.

(10) Patent No.: US 9,482,138 B2
(45) Date of Patent: Nov. 1, 2016

(54) EXHAUST DEVICE OF MOTORCYCLE

(71) Applicant: Kawasaki Jukogyo Kabushiki Kaisha, Kobe-shi, Hyogo (JP)

(72) Inventors: Toshiyuki Tsubone, Kobe (JP); Atsushi Senda, Kakogawa (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 0 days.

(21) Appl. No.: 14/928,687

(22) Filed: Oct. 30, 2015

(65) Prior Publication Data

US 2016/0053659 A1   Feb. 25, 2016

Related U.S. Application Data

(63) Continuation of application No. PCT/JP2014/060865, filed on Apr. 16, 2014.

(30) Foreign Application Priority Data

May 10, 2013   (JP) .................. 2013-100148

(51) Int. Cl.
  *F01N 1/02*   (2006.01)
  *F01N 13/08*  (2010.01)
  *F01N 13/20*  (2010.01)
  *F01N 13/14*  (2010.01)
  *F01N 1/08*   (2006.01)

(52) U.S. Cl.
  CPC ............. *F01N 13/08* (2013.01); *F01N 1/02* (2013.01); *F01N 13/14* (2013.01); *F01N 13/20* (2013.01); *F01N 1/084* (2013.01); *F01N 2470/14* (2013.01); *F01N 2470/18* (2013.01); *F01N 2490/08* (2013.01); *F01N 2590/04* (2013.01)

(58) Field of Classification Search
  CPC .......................................................... F01N 1/02
  USPC ................................................ 181/228, 227
  See application file for complete search history.

(56) References Cited

U.S. PATENT DOCUMENTS

| 7,624,842 | B2 | 12/2009 | Mizutani |
| 7,779,963 | B2 * | 8/2010 | Muto ............... F01N 1/003 180/296 |

(Continued)

FOREIGN PATENT DOCUMENTS

| JP | 59-179791 | 12/1984 |
| JP | 07-166859 | 6/1995 |

(Continued)

OTHER PUBLICATIONS

International Preliminary Report on Patentability and Written Opinion of the International Searching Authority dated Nov. 10, 2015 with English Translation (mailing date Nov. 19, 2015) for International PCT Patent Application No. PCT/JP2014/060865, filed Apr. 16, 2014 (12 pages).

*Primary Examiner* — Forrest M Phillips

(57) ABSTRACT

In an exhaust device in a motorcycle including an article storage pannier at a side portion of a rear portion of the motorcycle, a rear end surface of a muffler which discharges exhaust gas to the outside is located frontward of a front end surface of the pannier, and an outlet pipe of the muffler is curved such that the exhaust gas is discharged to a region below the pannier. An axis of the muffler is inclined so as to extend rearward and upward. A plurality of the outlet pipes are aligned vertically, and the upper outlet pipe is curved.

10 Claims, 3 Drawing Sheets

(56) References Cited

U.S. PATENT DOCUMENTS

| | | | |
|---|---|---|---|
| 7,784,586 B2* | 8/2010 | Ozeki | B60K 6/24 123/184.53 |
| 7,997,383 B2* | 8/2011 | Sakurai | F01N 1/003 181/227 |
| 8,322,479 B2* | 12/2012 | Tani | B62J 23/00 180/219 |
| 8,544,600 B2 | 10/2013 | Kato et al. | |
| 8,864,002 B2 | 10/2014 | Iida et al. | |
| 9,016,422 B2* | 4/2015 | Hayama | B62K 11/04 180/219 |
| 2008/0110693 A1 | 5/2008 | Muto | |
| 2008/0251314 A1 | 10/2008 | Mizutani | |
| 2011/0073627 A1 | 3/2011 | Iida et al. | |
| 2012/0228055 A1 | 9/2012 | Kato et al. | |
| 2014/0090924 A1* | 4/2014 | Uzawa | F01N 13/082 181/227 |

FOREIGN PATENT DOCUMENTS

| | | |
|---|---|---|
| JP | 2008-095548 | 4/2008 |
| JP | 2008-111357 | 5/2008 |
| JP | 2008-114711 | 5/2008 |
| JP | 2010-014027 | 1/2010 |
| JP | 2010-047164 | 3/2010 |
| JP | 2012-189020 | 10/2012 |

\* cited by examiner

EXHAUST DEVICE OF MOTORCYCLE

CROSS REFERENCE TO THE RELATED APPLICATION

This application is a continuation application, under 35 U.S.C §111(a) of international application No. PCT/JP2014/060865, filed Apr. 16, 2014, which claims priority to Japanese patent application No. 2013-100148, filed May 10, 2013, the entire disclosure of which is herein incorporated by reference as a part of this application.

BACKGROUND OF THE INVENTION

1. Field of the Invention

The present invention relates to an exhaust device in a motorcycle including an article storage pannier at a side portion of a rear portion of a motorcycle body.

2. Description of Related Art

A motorcycle has been known in which a muffler, which is a part of an exhaust device, is disposed at a lateral side of a rear wheel, and a pannier or storage box, which is an optional part, is mounted to a side portion of a rear portion of a motorcycle body. In such a motorcycle, if the mounting position of the pannier is lowered in accordance with a change in the design of the motorcycle, exhaust gas from the muffler may hit the pannier. If the position of the muffler is lowered, this affects the structure of an exhaust pipe at the upstream side of the muffler, and thus it is necessary to significantly change the design of the exhaust device, which requires a heavy design work.

In order to prevent exhaust gas from a muffler from hitting a pannier, an exhaust device has been suggested in which a muffler and an exhaust pipe extending from an engine are connected to each other by a joint having a bent portion, and in mounting a pannier, a mounting angle of the muffler toward the rear side can be changed by rotating the joint at a joined portion between the joint and the exhaust pipe (see Patent Document 1). An exhaust device has also been known in which an outlet pipe through which exhaust gas from a muffler is discharged is directed downward (see Patent Document 2). However, with the motorcycle including the exhaust device disclosed in Patent Document 2, no space for mounting a large-size pannier is present above the muffler. That is, there is no contemplation to equip this motorcycle with a pannier.

RELATED DOCUMENT

Patent Document

[Patent Document 1] JP Laid-open Patent Publication No. H07-166859
[Patent Document 2] JP Laid-open Patent Publication No. 2008-095548

However, although the exhaust device of Patent Document 1 has an advantage in that the muffler can be adjusted at a mounting angle at which exhaust gas does not hit the pannier, in order to change the mounting angle of the muffler, loosening and re-tightening of a bolt at the joined portion of the muffler, changing the mounting angle at flange portions at two locations and reassembling are required. Accordingly, the structure becomes complicated and an adjusting operation is not easy.

SUMMARY OF THE INVENTION

In view of the above-described problem, an object of the present invention is to provide an exhaust device of a motorcycle which exhaust device is able to prevent exhaust gas from a muffler from hitting a pannier, without changing the position of the muffler, even when a change in design has been made in which a mounting position of the pannier is lowered.

In order to achieve the above-described object, an exhaust device of a motorcycle according to the present invention includes a pannier at a side portion of a rear portion of the motorcycle. The exhaust device may include a muffler configured to discharge exhaust gas to an outside. The muffler may include a rear end surface located frontward of a front end surface of the pannier and an outlet pipe curved such that the exhaust gas is discharged to a region below the pannier.

According to this exhaust device, the outlet pipe of the muffler is curved toward a direction in which the exhaust gas is discharged to a region below the pannier. Therefore, when the pannier is mounted at a relatively low position because of a change in design, even if the muffler is disposed at the same position as in a conventional art, the exhaust gas from the outlet pipe does not hit the pannier. In addition, in the exhaust device, a simple change that is to merely curve the outlet pipe of an existing muffler is sufficient, and thus it is possible to suppress cost increase due to the change.

In the present invention, a longitudinal axis of the muffler is preferably inclined so as to extend rearward and upward. According to this configuration, although the axis of the muffler extends toward the pannier, the outlet pipe of the muffler is curved toward the direction in which the exhaust gas is discharged to a region below the pannier, and therefore, the exhaust gas from the outlet pipe does not hit the pannier.

In the present invention, preferably, a plurality of the outlet pipes are disposed one above the other or juxtaposed in a vertical direction, and the upper outlet pipe is curved. Of the plurality of the outlet pipes juxtaposed, only the upper outlet pipe having a high probability that the exhaust gas discharged therefrom hits the pannier is formed to be curved, and thus the structure is simplified.

In the present invention, the lower outlet pipe preferably has a straight shape to discharge the exhaust gas toward below the pannier. Since the lower outlet pipe is straight, it is possible to decrease the pipeline resistance of the lower outlet pipe.

In the present invention, preferably, the outlet pipe discharges the exhaust gas rearward through the rear end surface of the muffler, and an upper portion of an outer peripheral surface of a rear portion of the muffler is inclined so as to approach the axis of the muffler towards the rear. Thus, incoming wind during travelling of the motorcycle flows along the inclined upper portion of the outer peripheral surface of the rear portion of the muffler, whereby the incoming wind is guided in an obliquely downward and rearward of an outer peripheral surface of the muffler in front of the rear portion. The incoming wind effectively suppresses diffusion of the exhaust gas, which is discharged rearward from the rear end surface of the muffler, toward the pannier, and thus it is possible to further assuredly prevent the exhaust gas from hitting the pannier.

In the present invention, preferably, the front end surface of the pannier is inclined frontward such that an upper portion thereof is located frontward of a lower portion thereof, and the upper portion of the front end surface is located frontward of a rear end edge of the upper portion of the muffler. According to this configuration, it is possible to increase the capacity of the pannier by advancing the front end surface of the pannier while interference between the muffler and the pannier is avoided.

In the present invention, a rear end edge of an upper portion of the muffler is preferably located above a bottom surface of the pannier. According to this configuration, it is possible to increase the capacity of the pannier by lowering the bottom surface of the pannier.

In the present invention, the muffler has a plurality of expansion chambers therein, and at least one upstream side expansion chamber is disposed rearward of the downstreammost expansion chamber which communicates with the outlet pipe. Thus, the outlet pipe extends through the upstream side expansion chamber at the rear side of the motorcycle body and discharges the exhaust gas introduced into the downstreammost expansion chamber, through the rear end surface of the muffler to the outside. Accordingly, the outlet pipe is rendered to be relatively long, and therefore, it is easy to bend the outlet pipe.

In the present invention, a heat insulation member configured to suppress heat transmission from the exhaust gas to the pannier is preferably provided on a bottom surface of the pannier. Thus, the pannier is further effectively prevented from being heated by the exhaust gas.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Hereinafter, preferred embodiments of the present invention will be described in detail with reference to the drawings.

Figure 1:
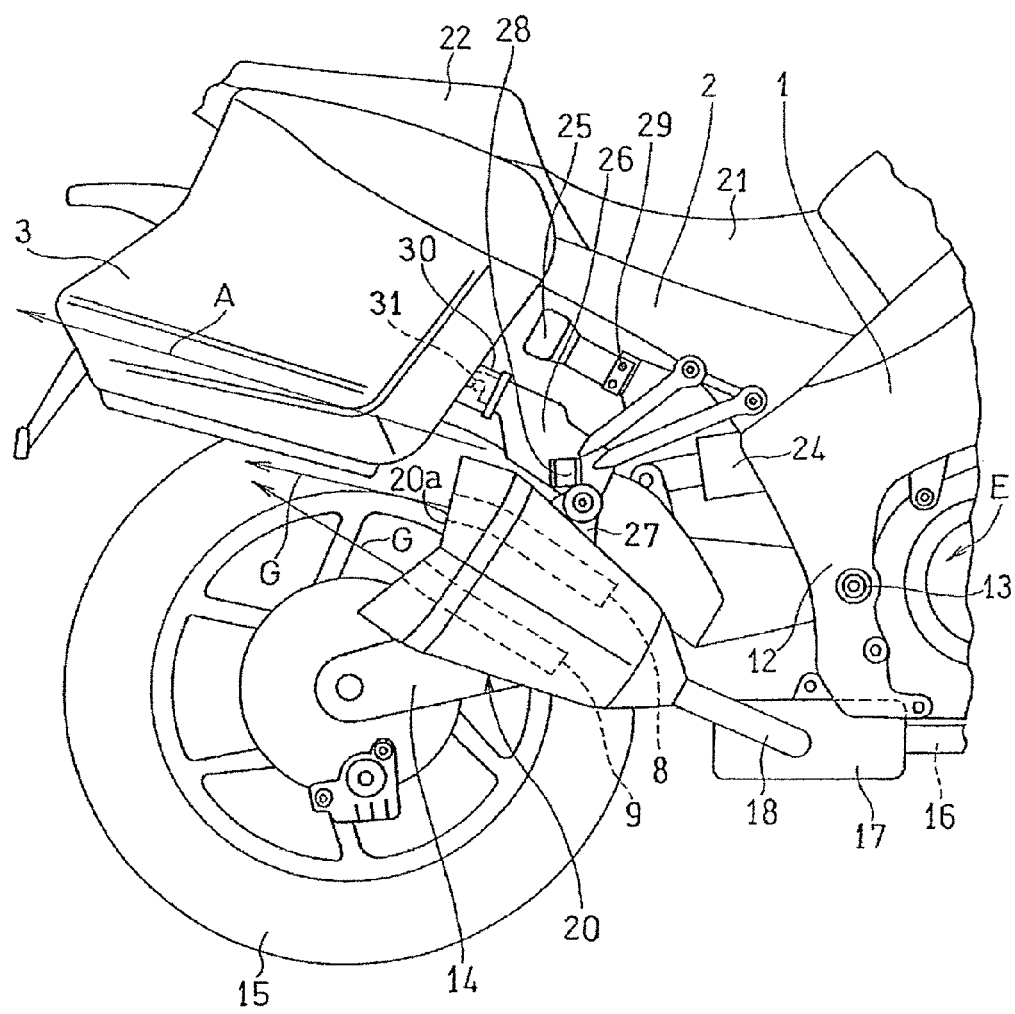
FIG. 1 is a side view showing a rear portion of a motorcycle including an exhaust device according to a preferred embodiment of the present invention.

FIG. 1 is a side view of a motorcycle including an exhaust device according to a preferred embodiment of the present invention. A motorcycle frame structure FR for the motorcycle includes: a main frame 1 which forms a front half of the motorcycle frame structure FR; and a rear frame 2 which is connected to a rear portion of the main frame 1 and forms a rear half of the motorcycle frame structure FR. A front wheel is supported by a front end portion of the main frame 1 via a front fork (not shown). A swingarm bracket 12 is provided at a lower portion of the rear end of the main frame 1, and a swingarm 14 is supported by the swingarm bracket 12 via a pivot shaft 13 at a front end portion thereof so as to be able to swing in a vertical direction. A rear wheel 15 is supported by a rear end portion of the swingarm 14. A combustion engine E is supported by a lower portion of the main frame 1, and the rear wheel 15 is driven by the engine E. The engine E is, for example, a parallel multi-cylinder four-cycle combustion engine.

Exhaust gas of the engine E passes through an exhaust pipe 16, extending rearward via the front side and the lower side of the engine E, and enters a silencer box 17 in front of the rear wheel 15. The exhaust gas passes, after being silenced to some extent in the silencer box 17, through a connection pipe 18, and enters a muffler 20 at a lateral side of the rear wheel 15 to be further silenced. Finally, the exhaust gas is discharged from the muffler 20 to the outside. Since the exhaust gas is silenced in two stages in this manner, the muffler 20 is smaller in size than in the case where there is no silencer box 17.

A rider's seat 21 and a passenger's seat 22 are supported by the rear frame 2. The lateral sides of a rear portion of the rear frame 2 are covered with a rear cover (not shown). A rear fender (not shown) is mounted to a lower portion of the rear frame 2. A single rear wheel shock absorber 24 is disposed below the rider's seat 21 so as to extend in a front-rear or longitudinal direction of the motorcycle and be connected between the main frame 1 and the swingarm 14. A passenger step 28 is supported by the rear frame 2 below the rider's seat 21 and above the muffler 20 via a step stay 26. The step stay 26 and the passenger step 28 are provided at each of the right and left sides.

In the motorcycle, a pannier or storage box 3 which is an optional part is disposed at a side portion of a rear portion of a motorcycle body, specifically, at a relatively low position above the rear side of the muffler 20. The pannier 3 includes an upper portion supported by the rear frame 2 and a front portion supported by the step stay 26, in detail, by a mounting projection 31 of the step stay 26 being fitted into a mounting tubular portion 30 projecting frontward from a front end surface 3a of the pannier 3. In addition, an oil pressure adjustment knob 25 for the rear wheel shock absorber 24 is supported by the step stay 26 via a bracket 29.

Since the muffler 20 is small in size as described above, the muffler 20 has a short length in the longitudinal direction and has a rear end surface 20a which is located frontward of the front end surface 3a of the pannier 3. The muffler 20 has a longitudinal axis or a muffler axis C extending rearward so as to be inclined upward and has a flared shape which gradually widens toward its rear end along the muffler axis C. Exhaust gas G is introduced from the engine E through the exhaust pipe 16, the silencer box 17, and the connection pipe 18 into the muffler 20. Two outlet pipes 8 and 9, through which the exhaust gas G is discharged to the outside, are provided within the muffler 20 so as to be aligned vertically. The outlet pipes 8 and 9 are disposed in parallel to the longitudinal direction of the motorcycle body (the front-rear direction) in a plan view, and extend rearward and upward in the side view of FIG. 1.

A rear portion of the upper outlet pipe 8 is curved toward a direction in which the exhaust gas G is discharged to a region below the pannier 3. The lower outlet pipe 9 extends straight similarly as in a conventional art and discharges the exhaust gas G to a region below the pannier 3. The portion of the upper outlet pipe 8, other than the curved rear portion, extends straight, and together with the lower outlet pipe 9, is parallel to the muffler axis C of the muffler 20. The muffler 20 is supported by the step stay 26 via a mounting piece 27 fixed to the muffler 20. Therefore, the step stay 26 for firmly supporting the passenger step 28 also supports the front portion of the pannier 3, the oil pressure adjustment knob 25, and the muffler 20.

Figure 2:
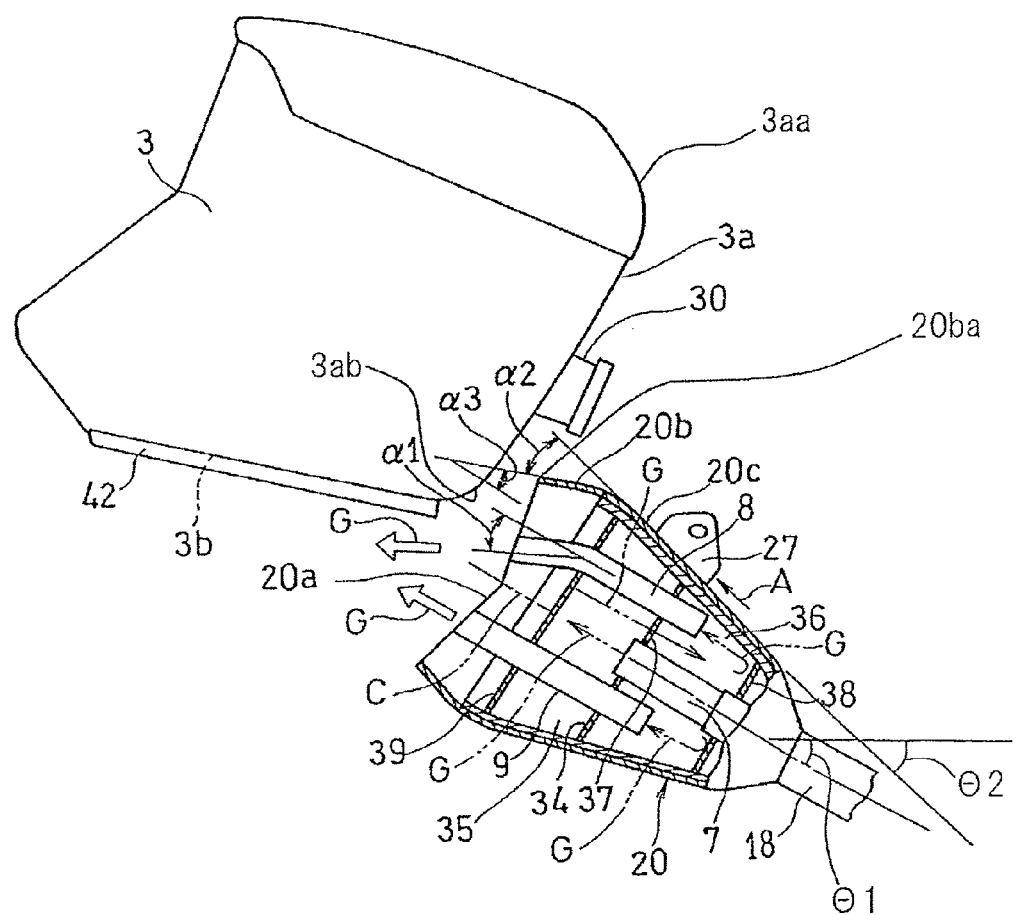
FIG. 2 is a partially cutaway exploded side view of the exhaust device.

As shown in FIG. 2, the interior of the muffler 20 is divided into a first expansion chamber 35 and a second expansion chamber 36 by a front wall 38, a partition wall 34, and a rear wall 39. The first expansion chamber 35 is located rearward of the second expansion chamber 36. The first and second expansion chambers 35 and 36 communicate with each other via a communication port 37. The exhaust gas G from the connection pipe 18 is introduced into the first expansion chamber 35 through an inlet pipe 7 supported so as to extend between and through the front wall 38 and the partition wall 34, and is introduced from the first expansion chamber 35 through the communication port 37 into the second expansion chamber 36. Then, the exhaust gas G is discharged to the outside through the two outlet pipes 8 and 9 supported so as to extend between and through the partition wall 34 and the rear wall 39.

The rear portion of the upper outlet pipe 8 is curved or bent downward toward the rear side at an angle $\alpha 1$ of about 25°. Thus, the upper outlet pipe 8 is set such that the exhaust gas G from the upper outlet pipe 8 is substantially horizontally discharged toward a region below the pannier 3. The muffler axis C of the muffler 20 is inclined so as to extend rearward and upward at a muffler inclination angle $\theta 1$ relative to a horizontal direction, that is, relative to a road surface, when a rider rides. The muffler inclination angle $\theta 1$ is preferably set within the range of 25° to 35°, and is about 30° in the present embodiment.

An upper portion 20b of the outer peripheral surface of a rear portion of the muffler 20 is inclined so as to approach the muffler axis C of the muffler 20 towards the rear end. A rear portion inclination angle $\alpha 2$ formed between the upper portion 20b of the outer peripheral surface and a muffler upper surface 20c frontward of the upper portion 20b, that is, an upper surface of a main portion of the muffler outer periphery, is set downward at about 30° such that incoming wind A flowing along the muffler upper surface 20c is directed toward the lower surface of the pannier 3. As a result, an angle $\alpha 3$ formed between the upper portion 20b of the rear portion outer peripheral surface at the muffler upper surface 20c and the muffler axis C is about 20°. The bending angle $\alpha 1$ is preferably set within the range of 25° to 35°. The inclination angle $\alpha 2$ is preferably set within the range of 30° to 40°. In addition, a peripheral surface inclination angle $\theta 2$ formed between the muffler upper surface 20c and a horizontal plane is set within the range of 40° to 50°, and is about 45° in the present embodiment.

The front end surface 3a of the pannier 3 is inclined frontward such that an upper portion 3aa thereof is located frontward of a lower portion 3ab thereof. The upper portion 3aa of the front end surface 3a is located frontward of a rear end edge 20ba of the upper portion 20b of the muffler 20. The rear end edge 20ba of the upper portion 20b of the muffler 20 is located above a bottom surface 3b of the pannier 3.

Figure 3:
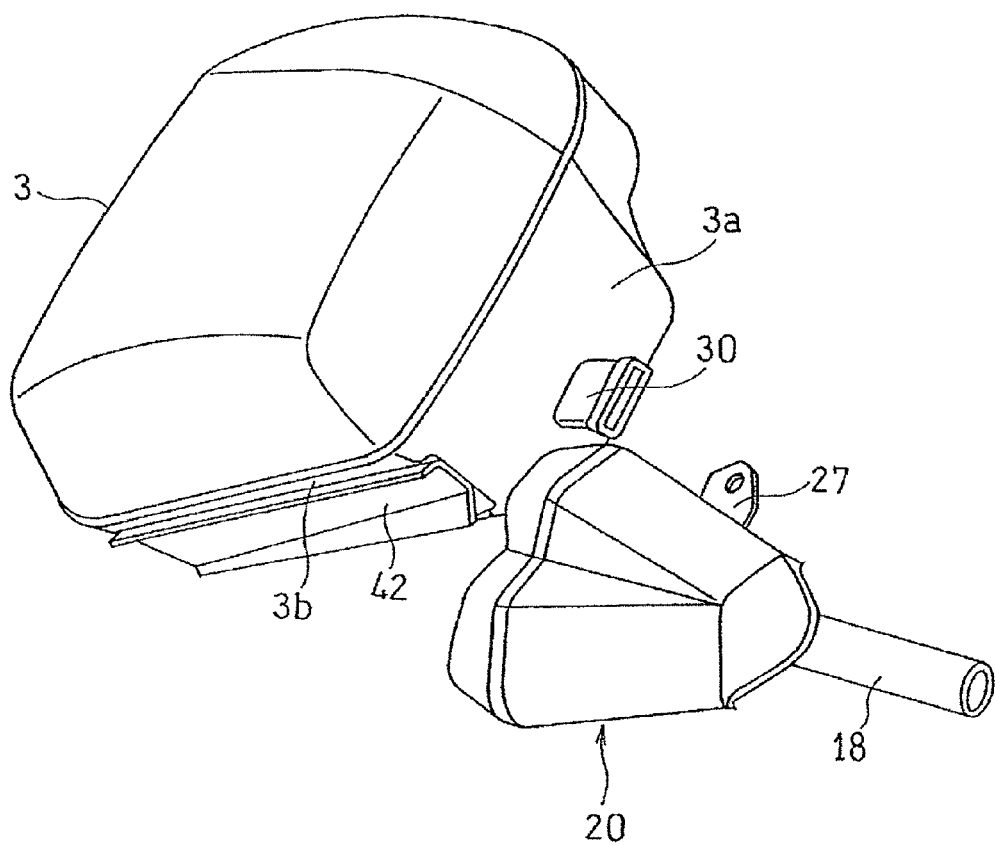
FIG. 3 is an exploded perspective view of the exhaust device as viewed from below.

As shown in FIG. 3, a heat insulation member 42 is joined to the bottom surface 3b of the pannier 3, which heat insulation member 42 suppresses heat transmission from the exhaust gas G, discharged from the outlet pipes 8 and 9, to the pannier 3. The heat insulation member 42 is composed of a plate formed in an elongated shape from a material such as an aluminum alloy or steel having high heat insulation. Opposite side portions in the widthwise direction of the heat insulation member 42 are bent downward at an angle of about 80 degrees. Therefore, the lower surface of the heat insulation member 42 forms a substantially U-shaped groove extending in the longitudinal direction, whereby the exhaust gas G is introduced rearward along the groove.

In the exhaust device of the motorcycle, while the muffler 20 shown in FIG. 1 is disposed at the same position as in the conventional art, the pannier 3 is disposed at a lower position than in the conventional art because of a change in design. However, since the outlet pipe 8 of the muffler 20 is curved toward the direction in which the exhaust gas G is discharged to a region below the pannier 3, the exhaust gas G from the outlet pipe 8 does not hit the pannier 3. In addition, in the exhaust device, since a simple change or modification that is to merely curve the outlet pipe 8 of the existing muffler 20 is sufficient, it is possible to suppress cost increase due to the change.

Of the upper and lower outlet pipes 8 and 9, only the upper outlet pipe 8, having a high probability that the exhaust gas G discharged therefrom hits the pannier 3, is curved, and thus the structure is simplified. Meanwhile, since the lower outlet pipe 9 has a straight shape in which the exhaust gas G is discharged toward a region below the pannier 3, it is possible to decrease the pipeline resistance of the lower outlet pipe 9.

As shown in FIG. 2, the outlet pipe 8 discharges the exhaust gas G rearward through the rear end surface 20a of the muffler 20, and the upper portion 20b of the outer peripheral surface of the rear portion of the muffler 20 is inclined so as to approach the muffler axis C towards the rear end. Thus, the incoming wind A during travelling of the motorcycle flows along the upper portion 20b of the outer peripheral surface of the rear portion of the muffler 20, whereby the incoming wind A is guided in an obliquely downward and rearward relative to the upper surface 20c of the muffler 20, that is, in a substantially horizontal direction in the present embodiment. The incoming wind A effectively suppresses diffusion of the exhaust gas G, which is discharged rearward from the rear end surface 20a of the muffler 20, toward the pannier 3, and thus it is possible to further assuredly prevent the exhaust gas G from hitting the pannier 3.

The front end surface 3a of the pannier 3 is inclined frontward such that the upper portion 3aa thereof is located frontward of the lower portion 3ab thereof, and the upper portion 3aa of the front end surface 3a is located frontward of the rear end edge 20ba of the upper portion 20b of the muffler 20. Thus, it is possible to increase the capacity of the pannier 3 by advancing frontward the front end surface 3a of the pannier 3 while interference between the muffler 20 and the pannier 3 is avoided.

Since the rear end edge 20ba of the upper portion 20b of the muffler 20 is located above the bottom surface 3b of the pannier 3, it is possible to increase the capacity of the pannier by lowering the bottom surface 3b of the pannier 3.

The muffler 20 has the upstream and downstream side expansion chambers 35 and 36, and the upstream side expansion chamber 35 is located rearward of the downstream side expansion chamber 36 which communicates with the outlet pipes 8 and 9. Thus, the outlet pipe 8 extends through the upstream side expansion chamber 35 at the rear side of the motorcycle body and discharges the exhaust gas G introduced into the downstream side expansion chamber 36, through the rear end surface 20a of the muffler 20, to the outside. Therefore, the outlet pipe 8 is rendered to be relatively long, and thus it is easy to bend the outlet pipe 8.

Since the heat insulation member 42, which suppresses heat transmission from the exhaust gas G to the pannier 3, is provided on the bottom surface 3b of the pannier 3 as shown in FIG. 3, the pannier 3 is further effectively prevented from being heated by the exhaust gas G.

The present invention is not limited to the above-described embodiment, and various additions, changes, or deletions can be made without departing from the gist of the present invention, and are to be construed as included within the scope of the present invention. For example, the interior of the muffler 20 may be divided into three or more expansion chambers. In this case, the exhaust gas G, introduced into the downstreammost side expansion chamber located at the frontmost position, is discharged via the upper outlet pipe extending through a plurality of upstream side expansion chambers at the rear side, through the rear surface 20a of the muffler 20 to the outside. Thus, the upper outlet pipe 8 is furthermore elongated, and it is easier to curve the upper outlet pipe 8.

REFERENCE NUMERALS

3 . . . pannier
3a . . . front end surface of pannier
3b . . . bottom surface of pannier
8 . . . upper outlet pipe
9 . . . lower outlet pipe
20 . . . muffler
20a . . . rear end surface of muffler
20b . . . upper portion of outer peripheral surface of rear portion of muffler
35 . . . first expansion chamber (upstream side expansion chamber)
36 . . . second expansion chamber (downstreammost expansion chamber)
42 . . . heat insulation member
G . . . exhaust gas
C . . . axis of muffler

What is claimed is:

1. An exhaust device in a motorcycle including a pannier at a side portion of a rear portion of the motorcycle, wherein
    the exhaust device comprising a muffler configured to discharge exhaust gas to an outside, the muffler having a rear end surface located frontward of a front end surface of the pannier, and the muffler has a plurality of expansion chambers therein, and also a plurality of outlet pipes are disposed one above the other, and an upper outlet pipe is curved;
    wherein at least one upstream side expansion chamber is disposed rearward of the downstreammost expansion chamber which communicates with the curved outlet pipe so that the exhaust gas is discharged to a region below the pannier.

2. The exhaust device in the motorcycle as claimed in claim 1, wherein a longitudinal axis of the muffler is inclined so as to extend rearward and upward.

3. The exhaust device in the motorcycle as claimed in claim 1, wherein the lower outlet pipe has a straight shape to discharge the exhaust gas below the pannier.

4. The exhaust device in the motorcycle as claimed in claim 1, wherein the outlet pipe protrudes rearward from the rear end surface of the muffler, and an upper portion of an outer peripheral surface of a rear portion of the muffler is inclined so as to approach the axis of the muffler towards the rear.

5. The exhaust device in the motorcycle as claimed in claim 1, wherein:
    the front end surface of the pannier is inclined frontward such that an upper portion thereof is located frontward of a lower portion thereof; and
    the upper portion of the front end surface is located frontward of a rear end edge of the upper portion of the muffler.

6. The exhaust device in the motorcycle as claimed in claim 1, wherein a rear end edge of an upper portion of the muffler is located above a bottom surface of the pannier.

7. The exhaust device in the motorcycle as claimed in claim 1, further comprising a heat insulation member configured to suppress heat transmission from the exhaust gas to the pannier on a bottom surface of the pannier.

8. An exhaust device in a motorcycle including a pannier at a side portion of a rear portion of the motorcycle, wherein:
    the exhaust device comprising a muffler configured to discharge exhausting gas from a plurality of interior expansion chambers within the muffler through a plurality of outlet pipes disposed one above another with an upper outlet curved pipe, wherein at least one upstream side expansion chamber is disposed rearward of a downstreammost expansion chamber, which communicates with the curved outlet pipe so that the exhaust gas is discharged to a region below the pannier, wherein a bottom surface of the pannier includes a substantially U-shaped groove of a heat insulation member to direct exhaust gas rearward of the pannier along the U-shaped groove.

9. The exhaust device of claim 8 wherein the heat insulation member is formed of metal.

10. The exhaust device of claim 9 wherein a lower outlet pipe has a straight shape through the muffler to discharge exhaust gas below the pannier.

* * * * *